(12) United States Patent
Calkic et al.

(10) Patent No.: US 12,313,405 B2
(45) Date of Patent: May 27, 2025

(54) ACCESSORY FOR A LASER RECEIVER FOR TRANSFERRING A LASER LINE

(71) Applicant: Hilti Aktiengesellschaft, Schaan (LI)

(72) Inventors: Ermin Calkic, Buchs (CH); Patrick Lampert, Schaanwald (LI)

(73) Assignee: Hilti Aktiengesellschaft, Schaan (LI)

( * ) Notice: Subject to any disclaimer, the term of this patent is extended or adjusted under 35 U.S.C. 154(b) by 579 days.

(21) Appl. No.: 17/777,490

(22) PCT Filed: Nov. 16, 2020

(86) PCT No.: PCT/EP2020/082192
§ 371 (c)(1),
(2) Date: May 17, 2022

(87) PCT Pub. No.: WO2021/104908
PCT Pub. Date: Jun. 3, 2021

(65) Prior Publication Data
US 2022/0404149 A1    Dec. 22, 2022

(30) Foreign Application Priority Data
Nov. 26, 2019 (EP) .................................... 19211552

(51) Int. Cl.
*G01C 15/02* (2006.01)
*G01C 15/00* (2006.01)

(52) U.S. Cl.
CPC ........... *G01C 15/006* (2013.01); *G01C 15/02* (2013.01)

(58) Field of Classification Search
CPC ....... G01C 15/02; G01C 15/04; G01C 15/006
USPC ..... 33/227, 274, 275 R, 282, 285, 286, 290, 33/293
See application file for complete search history.

(56) References Cited

U.S. PATENT DOCUMENTS

| | | | |
|---|---|---|---|
| 6,209,832 B1 | 4/2001 | Yamazaki et al. | |
| 6,430,823 B1* | 8/2002 | Seki ................... | G01C 15/004 33/286 |
| 6,922,901 B1* | 8/2005 | Chou .................. | G01C 15/004 33/290 |
| 7,152,334 B2* | 12/2006 | Gamal ................ | G01C 15/008 33/290 |
| 7,564,020 B2 | 7/2009 | Sergeyeyenko et al. | |
| 7,748,126 B2* | 7/2010 | Lu ....................... | G01C 15/004 33/286 |

(Continued)

FOREIGN PATENT DOCUMENTS

| | | |
|---|---|---|
| CN | 207095560 U | 3/2018 |
| DE | 202010005327 U1 | 8/2011 |
| JP | H04242112 A | 8/1992 |

OTHER PUBLICATIONS

International Search Report of PCT/EP2020/082192, Feb. 10, 2021.

*Primary Examiner* — George B Bennett
(74) *Attorney, Agent, or Firm* — Davidson Kappel LLC (57) ABSTRACT

Accessory (30) for a laser receiver for transferring a laser line to a work surface, including a base plate (35) with a front side and a rear side, with which the accessory (30) is able to be arranged on the work surface, a connection device (36) for connecting the laser receiver to the accessory (30), and a rotary joint (37) that is arranged between the base plate (35) and the connection device (36), wherein the connection device (36) is rotatable about an axis of rotation (39) relative to the base plate (35) between a first angle and a second angle.

12 Claims, 5 Drawing Sheets

(56) References Cited

U.S. PATENT DOCUMENTS

| | | | | |
|---|---|---|---|---|
| 7,797,846 B2* | 9/2010 | Walser | ............... | A63C 19/06 |
| | | | | 33/290 |
| 9,057,607 B2* | 6/2015 | Travis | ............... | G01C 15/004 |
| 9,513,121 B2 | 12/2016 | Kallabis et al. | | |
| 11,859,999 B2* | 1/2024 | Shi | ............... | G01C 15/004 |
| 2003/0014872 A1* | 1/2003 | Chen | ............... | G01C 15/004 |
| | | | | 33/286 |
| 2006/0213069 A1* | 9/2006 | Martin | ............... | G01C 15/008 |
| | | | | 33/286 |
| 2007/0107241 A1 | 5/2007 | Sergeyeyenko et al. | | |
| 2018/0195862 A1* | 7/2018 | Reed | ............... | G01C 15/06 |
| 2023/0221117 A1* | 7/2023 | Ran | ............... | F16M 11/18 |
| | | | | 33/290 |

* cited by examiner

ACCESSORY FOR A LASER RECEIVER FOR TRANSFERRING A LASER LINE

TECHNICAL FIELD

The present invention relates to an accessory for a laser receiver for transferring a laser line.

BACKGROUND

In order to detect the center of a laser beam generated by a rotating laser that is rotating or by a line laser, laser receivers that have a housing with a line-like sensor element extending along a longitudinal side for capturing the laser beam are used. The sensor element should in this case be aligned with the laser beam in such a way that the laser beam intersects the sensor element perpendicularly and centrally. A display of the laser receiver indicates when the center of the sensor element has been reached. A marking or notch in one longitudinal side of the housing with which the laser line can be transferred to the work surface is assigned to this region.

Figure 1A:
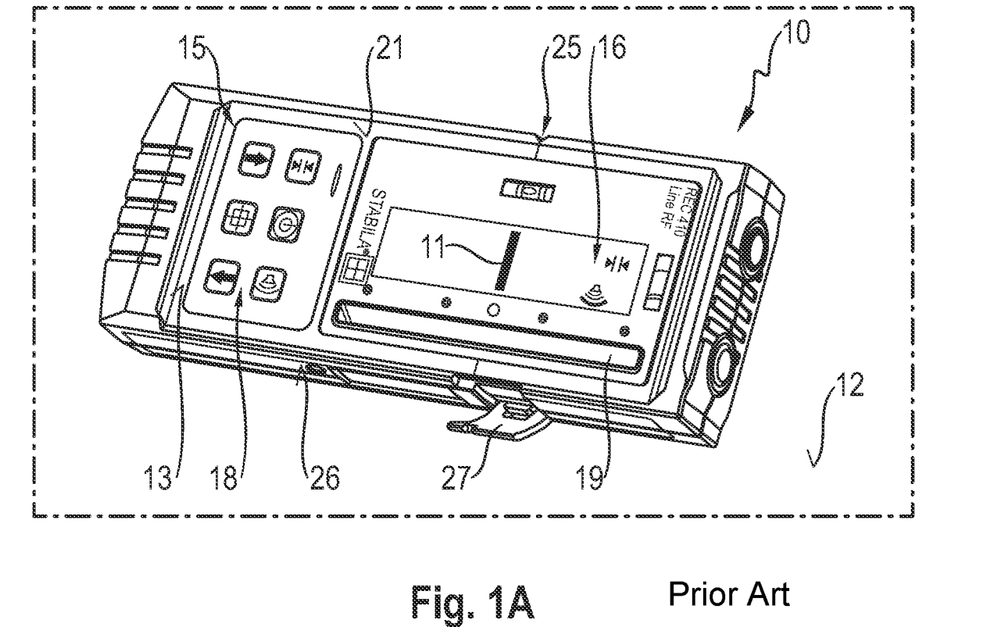
FIGS. 1A, B show a known laser receiver with an accessory for transferring a laser line to a work surface.
Figure 1B:
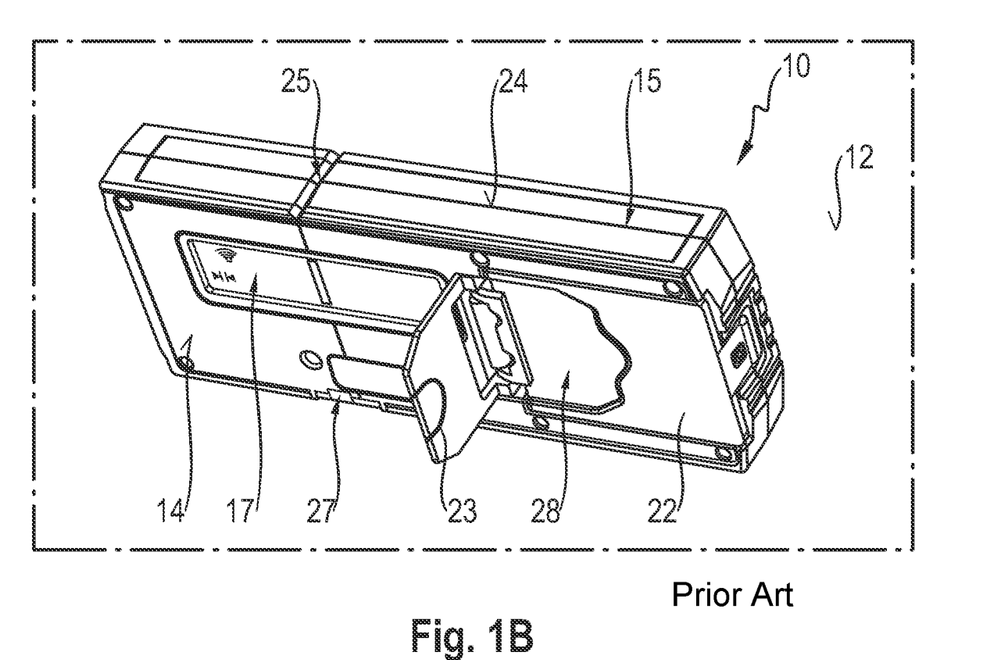

FIGS. 1A, B show a known laser receiver 10 with an accessory for transferring a laser line 11 to a work surface 12. In this case, FIG. 1A shows the laser receiver 10 in a view of a front side 13 of the laser receiver 10 and FIG. 1B shows it in a view of a rear side 14 of the laser receiver 10. The laser receiver 10 comprises a housing 15, a first display 16, a second display 17, an operating device 18 with a plurality of operating elements, and a sensor element 19. The first display 16, the operating device 18, and the sensor element 19 are arranged in a front face 21 of the housing 15. In addition to the second display 17, a steel plate and a support element 23 that can be folded out are arranged on a rear face 22 of the housing 15. The steel plate is integrated into the housing 15; the laser receiver 10 can be attached directly to a magnetic holder or to magnetic objects by means of the steel plate. A first marking element 25 is integrated into a first side face 24 of the housing 15, and a second marking element 27 that can be folded out is arranged in a second side face 26 of the housing 15.

The support element 23 is adjustable between a folded-in position and a folded-out position. A recess 28 for the support element 23 that, in the folded-in position, is flush with the housing 15 so that the laser receiver 10 can be positioned with the rear face 22 on a flat work surface is located in the rear face 22 of the housing 15. The support element 23 can be folded out by approx. 90° and enables the laser receiver 10 to be positioned on the ground or on a horizontal work surface.

The known laser receiver 10 has the disadvantage that the support element 23 only rests on the work surface 12 with a narrow contact surface and the position of the laser receiver 10 is unstable when the laser line 11 is transferred to the work surface 12. In addition, the angular position of the known laser receiver 10 cannot be changed, with the result that the sensor element 19 cannot be optimally aligned with the incident laser beam.

SUMMARY OF THE INVENTION

It is an object of the present invention to develop an accessory for a laser receiver which makes the transfer of a laser line from a laser receiver to the work surface easier for the operator. The laser line should be transferred here to the work surface with great accuracy.

The accessory according to the invention for a laser receiver for transferring a laser line to a work surface comprises:
- a base plate with a front side and a rear side, with which the accessory is able to be arranged on the work surface,
- a connection device for connecting the laser receiver to the accessory, and
- a rotary joint that is arranged between the base plate and the connection device, wherein the connection device is rotatable about an axis of rotation relative to the base plate between a first angle and a second angle.

The accessory according to the invention enables stable positioning of the laser receiver on the work surface and accurate alignment of the laser receiver with the laser beam to be captured. The rear side of the base plate is arranged on the work surface to which the laser line is to be transferred. The size of the base plate is adapted here to the size of the laser receiver that is to be connected to the accessory, and is chosen such that the accessory can be positioned stably on the work surface. The rotary joint, which is arranged between the base plate and the connection device, enables the laser receiver to be aligned accurately with the laser beam, with the result that the sensor element is arranged as perpendicularly to the laser beam as possible. The first and second angles delimit an angular range within which the rotary joint is adjustable.

The rotary joint is preferably lockable in at least one rotational position between the first angle and the second angle. Lockable means that the rotary joint is securely arranged in the rotational position and the rotational position is not left without intervention by the operator. A rotary joint that is lockable in at least one rotational position between the first and second angle makes it possible to arrange the laser receiver stably in a rotational position, with the result that the laser line that the laser beam generates on the sensor element can be transferred to the work surface.

The rotary joint is with particular preference lockable in a plurality of rotational positions between the first angle and the second angle. A rotary joint that is lockable in a plurality of rotational positions between the first and second angle enables the laser receiver to be arranged relative to the laser beam in such a way that the laser beam is incident on the sensor element as perpendicularly as possible. The visibility of the laser line depends, among other things, on the angle at which the laser beam is incident on the sensor element, wherein perpendicular incidence is preferred.

The rotary joint is lockable with particular preference in any rotational position between the first angle and the second angle. The visibility of the laser line depends, among other things, on the angle at which the laser beam is incident on the sensor element, wherein perpendicular incidence is preferred. A rotary joint that is lockable in any rotational position between the first and second angle enables the laser receiver to be arranged relative to the laser beam in such a way that the laser beam is incident perpendicularly on the sensor element.

In a first preferred embodiment, the accessory has a marking element arranged on a side face of the base plate. A marking element that is arranged on a side face of the base plate has the advantage that the marking element rests on the work surface and the laser line can be transferred to the work surface with great accuracy.

The marking element is preferably adjustable as a foldable ruler about a pivot axis between a folded-in position and a folded-out position. A marking element that is designed as a foldable ruler has the advantage that the marking element can be designed to be longer than a fixed marking element arranged on a side face of the base plate.

The pivot axis is particularly preferably arranged perpendicularly to the axis of rotation of the rotary joint. If the pivot axis of the marking element is arranged perpendicularly to the axis of rotation of the rotary joint, the marking element can dip into the side face of the base plate in the folded-in position and be flush with the side face. In addition, the size of the base plate can be advantageously used in this arrangement of the pivot axis. The longer the marking element is, the better the operator can transfer the laser line to the work surface.

In a second preferred embodiment, the accessory has a first marking element arranged on a first side face of the base plate and a second marking element arranged on a second side face of the base plate. If the base plate has a first and a second marking element that are respectively arranged on the first and second side faces of the base plate, the laser line can be transferred with great accuracy to both sides of the work surface.

The first marking element is preferably adjustable as a foldable first ruler about a first pivot axis between a folded-in position and a folded-out position, and the second marking element is adjustable as a foldable second ruler about a second pivot axis between a folded-in position and a folded-out position. A foldable first and second ruler have the advantage that the first and second marking elements can be designed to be longer than fixed marking elements that are arranged on the side faces of the base plate.

With particular preference, the first pivot axis is arranged perpendicularly to the axis of rotation of the rotary joint and the second pivot axis is arranged perpendicularly to the axis of rotation of the rotary joint. If the first and second pivot axes of the marking elements are arranged perpendicularly to the axis of rotation of the rotary joint, the first and second marking elements can dip into the respective first and second side face of the base plate in the folded-in position and be flush with the side faces.

In a third preferred embodiment, the accessory has a spray device, which comprises a container, a control element, and an actuating element. An accessory with a spray device allows the laser line to be easily transferred to the work surface. If the laser beam is incident on the center of the sensor element, the spray device can transfer the laser line to the work surface. For this purpose, the spray device has, for example, a nozzle that is aligned parallel to the laser line.

The spray device preferably has a user interface and/or an interface to the laser receiver. A spray device that has a user interface and/or an interface to the laser receiver offers the possibility of transferring a laser line to the work surface due to being triggered by the operator or being triggered by the laser receiver.

Exemplary embodiments of the invention are described hereinafter with reference to the drawing. These are not necessarily intended to show the exemplary embodiments to scale; rather the drawing, where useful for explanation, is produced in a schematic and/or slightly distorted form. It should be taken into account here that various modifications and alterations relating to the form and detail of an embodiment may be undertaken without departing from the general concept of the invention. The general concept of the invention is not limited to the exact form or the detail of the preferred embodiment shown and described hereinafter or limited to subject matter that would be limited compared to the subject matter claimed in the claims. For given dimensioning ranges, values within the stated limits should also be disclosed as limit values and can be used and claimed as desired. For the sake of simplicity, identical reference signs are used hereinafter for identical or similar parts or parts having identical or similar functions.

DETAILED DESCRIPTION

Figure 2:
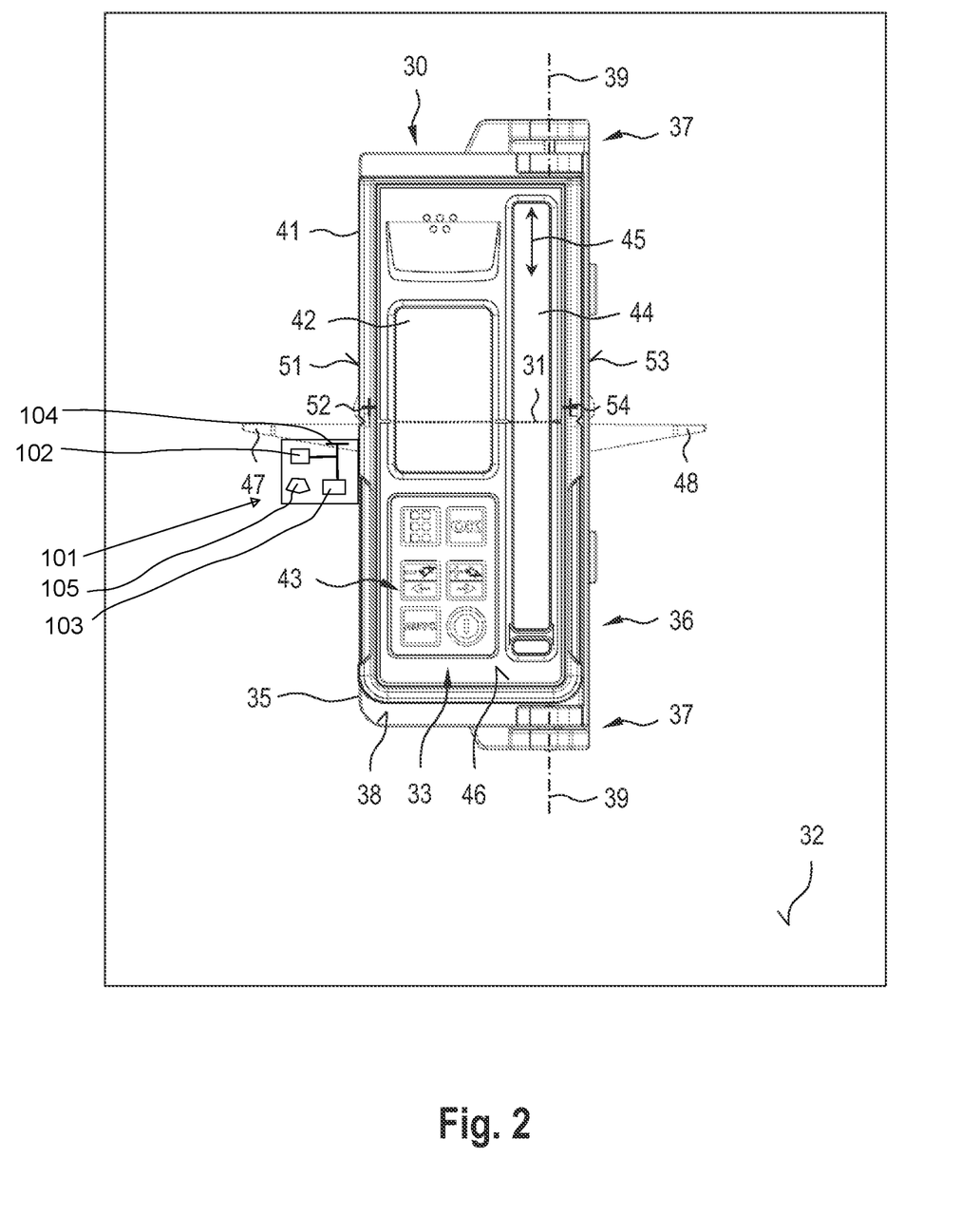
FIG. 2 shows a first embodiment of an accessory according to the invention, which is combined with a laser receiver, for transferring a laser line to a work surface.

FIG. 2 shows a first embodiment of an accessory 30 according to the invention for transferring a laser line 31 to a work surface 32. The accessory 30 is combined with a laser receiver 33 and is held by the operator against the work surface 32 that is in the form of a wall. The task for the operator consists in transferring the laser line 31 as accurately as possible to the work surface 32.

The accessory 30 comprises a base plate 35, a connection device 36 connecting the accessory 30 to the laser receiver 33, and a rotary joint 37. The base plate 35 has a front side 38 and a rear side located opposite the front side 38. The rear side of the base plate is designed to be flat and is used to position the accessory 30 with the laser receiver 33 on the work surface 32. The size of the base plate 35 is adapted to the size of the laser receiver 33 and is selected to be such that the accessory 30 can be stably positioned on the work surface 32. The rotary joint 37 connects the connection device 36 to the base plate 35, wherein the connection device 36 is rotatable about an axis of rotation 39 relative to the base plate 35.

The laser receiver 33 comprises a housing 41, a display 42, an operating device 43 with a plurality of operating elements, and an elongated sensor element 44, the longitudinal direction of which defines the measurement direction 45 of the laser receiver 33. The display 42, the operating device 43, and the sensor element 44 are arranged in a front face 46 of the housing 41. The laser receiver 33 has in one side face two magnetic elements or two steel elements with the aid of which the laser receiver 33 can be attached via a magnetic connection.

In order to support the operator in transferring the laser line 31 to the work surface 32, the accessory 30 has a first marking element 47 and a second marking element 48, which are attached to the base plate 35. The first and second marking elements 47, 48 are designed as foldable rulers and are adjustable about a pivot axis between a folded-in state and a folded-out state. The first marking element 47 is arranged on a first side face 51 of the base plate 35 and is adjustable about a first pivot axis 52, and the second marking element 48 is arranged on a second side face 53 of the base plate 35 and adjustable about a second pivot axis 54.

The first and second pivot axes 52, 54 are arranged parallel to the first and second side faces 51, 53 and perpendicular to the axis of rotation 39 of the rotary joint 37. This arrangement has the advantage that the first and second marking elements 47, 48 can be designed to be longer than marking elements having pivot axes that are arranged parallel to the axis of rotation 39 of the rotary joint 37. As noted above, in a third preferred embodiment, the accessory has a spray device shown schematically in FIG. 2 as 101, which comprises a container 102, a control element 103, and an actuating element 104. The spray device preferably has a user interface 105 and/or an interface to the laser receiver.

Figure 3:
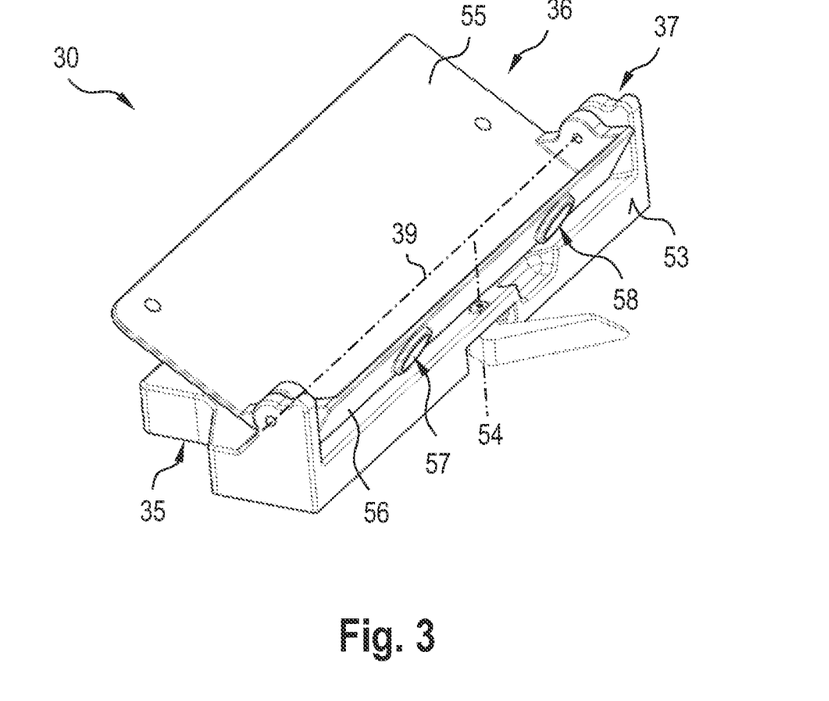
FIG. 3 shows the accessory of FIG. 2 without the laser receiver.

FIG. 3 illustrates the accessory 30 according to the invention of FIG. 2 without the laser receiver 33 and marking element 38 removed for clarity. The accessory 30 comprises the base plate 35, the connection device 36, and the rotary joint 37.

The connection device 36 is used to connect the accessory 30 to the laser receiver 33. In the exemplary embodiment, the connection device 36 is designed in the form of an angle plate, which has a horizontal plate 55 and a vertical plate 56 oriented perpendicularly to the horizontal plate.

A first magnetic element 57 and a second magnetic element 58 are arranged in the vertical plate and form a magnetic connection with the magnetic elements of the laser receiver 33 (FIG. 2). As an alternative to the arrangement in the vertical plate, the first and second magnetic elements can be arranged in the horizontal plate and form a magnetic connection with magnetic or steel elements of the laser receiver 33.

By means of the rotary joint 37, the angle plate 36 is adjustable about the axis of rotation 39 within an angular range between a first angle $\theta_1$ and a second angle $\theta_2$. (See, e.g., FIG. 4B). In the exemplary embodiment, the angle plate 36 is adjustable within an angular range of approx. 90° between the first angle $\theta_1$ of 0° and the second angle $\theta_2$ of approximately 90°.

Figure 4A:
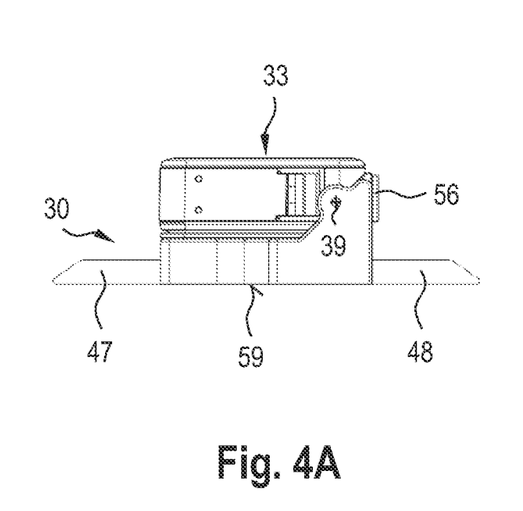
FIGS. 4A, B show the accessory of FIG. 2, which is adjustable about an axis of rotation, in a first rotational position (FIG. 4A) and in a second rotational position (FIG. 4B)
Figure 4B:
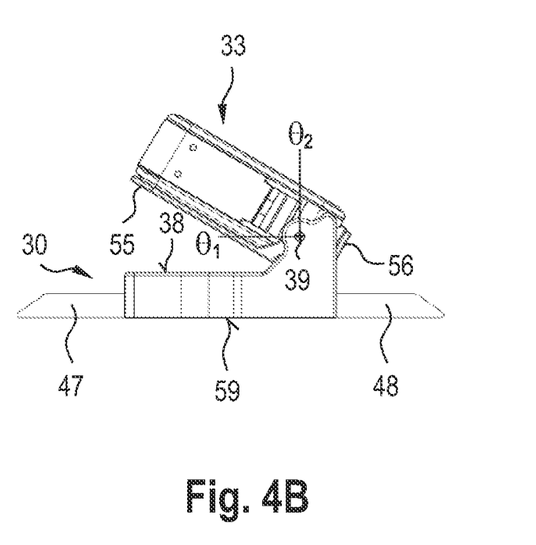

FIGS. 4A, B show the accessory 30 of FIG. 2 in a first rotational position (FIG. 4A) and in a second rotational position (FIG. 4B). The base plate 35 is arranged on the work surface 32 with a rear side 59 located opposite the front side 38.

The visibility of the laser line 31 (see, e.g. FIG. 2) depends, among other things, on the angle at which the laser beam generated by a rotating laser or line laser is incident on the sensor element 44 of the laser receiver 33, wherein perpendicular incidence is preferred. The first rotational position (FIG. 4A) corresponds to the first angle $\theta_1$ of 0°, and the second rotational position (FIG. 4B) shows an intermediate angle of approx. 45° in the angular range of the rotary joint 37 between the first and second angle.

Figure 5A:
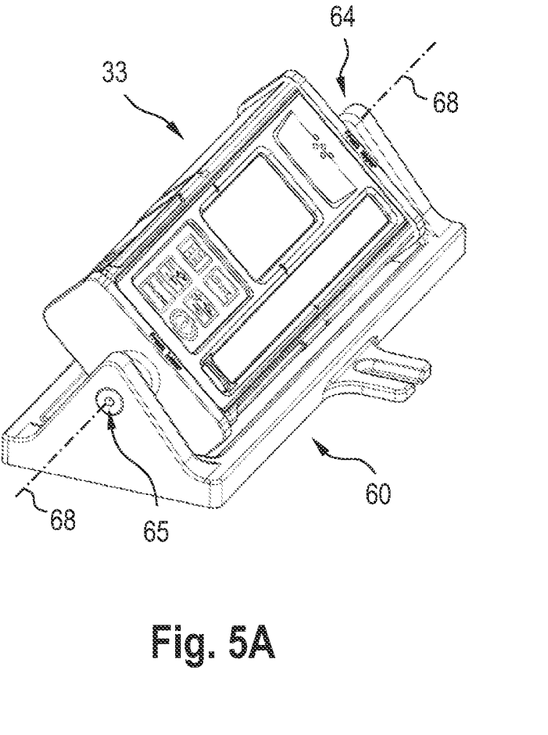
FIGS. 5A-C show a second embodiment of an accessory according to the invention, which is combined with a laser receiver, for transferring a laser line to a work surface in a three-dimensional illustration (FIG. 5A), in a view of the front side of the laser receiver (FIG. 5B) and in a view of a side face of the laser receiver (FIG. 5C)
Figure 5B:
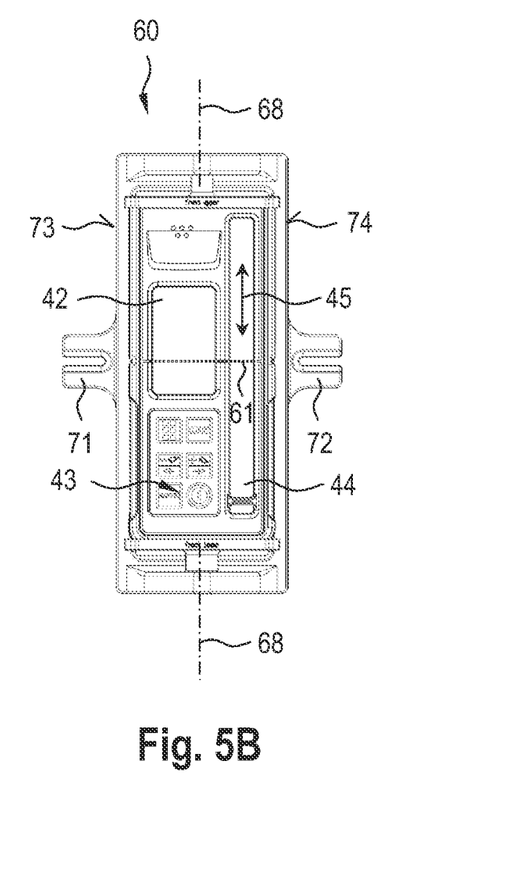
Figure 5C:
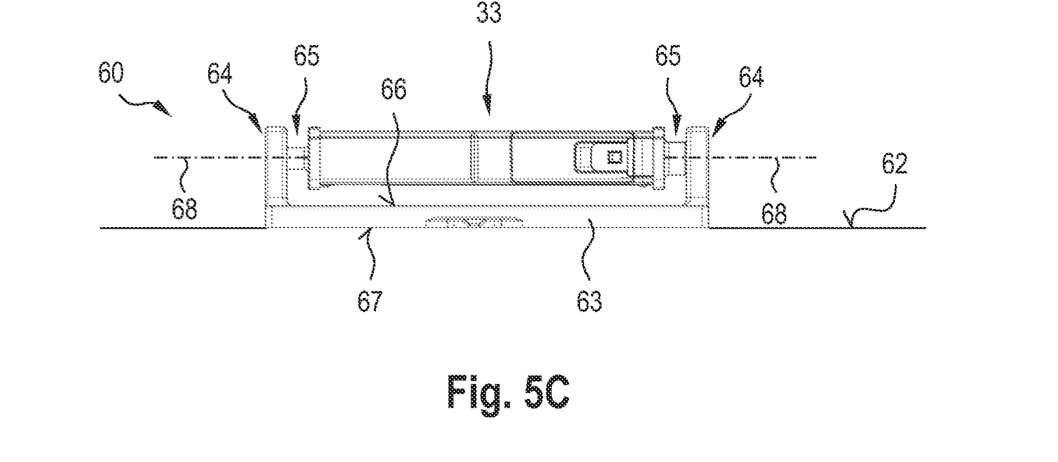

FIGS. 5A-C show a second embodiment of an accessory 60 according to the invention for transferring a laser line 61 onto a work surface 62. The accessory 60 is combined with the laser receiver 33 and is held by the operator against the work surface 62 that is in the form of a ground or floor. In this case, FIG. 5A shows the accessory 60 and the laser receiver 33 in a three-dimensional illustration, FIG. 5B shows them in a view of the front side of the laser receiver 33, and FIG. 5C shows them in a view of a side face of the laser receiver 33.

The accessory 60 comprises a base plate 63, a connection device 64 connecting the accessory 60 to the laser receiver 33, and a rotary joint 65. The base plate 63 has a front side 66 and a rear side 67 located opposite the front side 66.

The rotary joint 65 connects the connection device 64 to the base plate 63, wherein the connection device 64 is rotatable about an axis of rotation 68 relative to the base plate 63. With the aid of the rotary joint 65, the connection device 64 is adjustable about the axis of rotation 68 within an angular range between a first angle $\theta_1$ and a second angle $\theta_2$. In the exemplary embodiment, the connection device 64 is adjustable within an angular range of approx. 90° between the first angle $\theta_1$ of approx. −45° and the second angle $\theta_2$ of approximately 45°.

In order to support the operator in transferring the laser line 61 to the work surface 62, the accessory 60 has a first marking element 71 and a second marking element 72, which are attached to the base plate 63. The first and second marking elements 71, 72 are designed as fixed indication notches attached to the side faces of the base plate 63. The first marking element 71 is attached to a first side face 73 of the base plate 63, and the second marking element 72 is attached to a second side face 74 of the base plate 63.

Figure 6A:
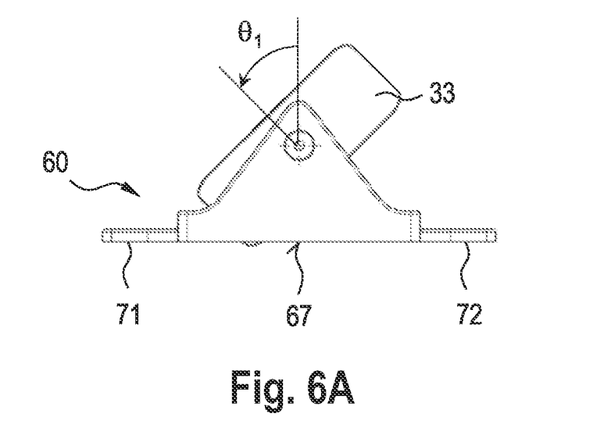
FIGS. 6A-C show the accessory of FIGS. 5A-C, which is adjustable about an axis of rotation, in a first rotational position (FIG. 6A), a second rotational position (FIG. 6B), and a third rotational position (FIG. 6C).
Figure 6B:
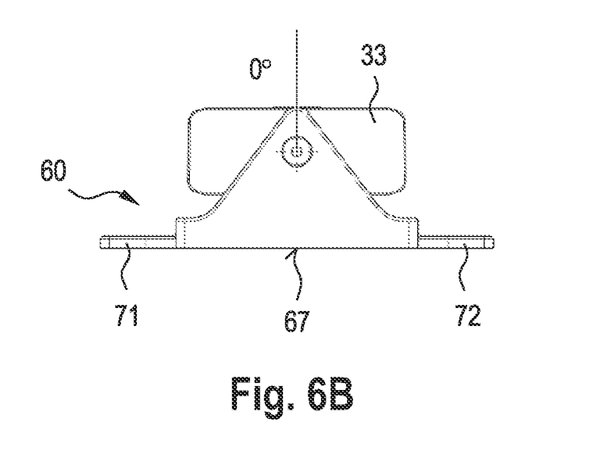
Figure 6C:
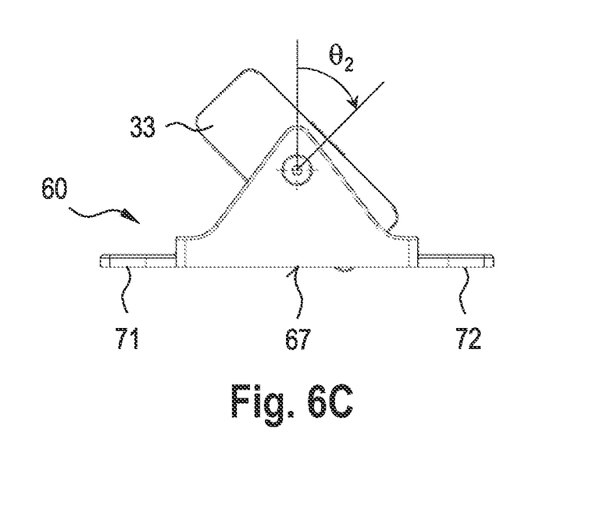

FIGS. 6A-C show the accessory 60 of FIG. 5 in three different rotational positions. The accessory 60 is adjustable about the axis of rotation 68 between the first angle $\theta_1$ and the second angle $\theta_2$. FIG. 6A shows the accessory 60 in a first rotational position, FIG. 6B shows it in a second rotational position, and FIG. 6C shows it in a third rotational position.

The visibility of the laser line 61 depends, among other things, on the angle at which the laser beam generated by a rotating laser or line laser is incident on the sensor element 44 of the laser receiver 33, wherein perpendicular incidence is preferred. The first rotational position of the accessory 60 (FIG. 6A) corresponds to the first angle $\theta_1$ of −45°, the second rotational position of the accessory 60 (FIG. 6B) shows an intermediate angle of approx. 0° in the angular range of the rotary joint 65 between the first and second angle, and the third rotational position of the accessory 60 (FIG. 6C) corresponds to the second angle $\theta_2$ of +45°.

What is claimed is:

1. An accessory for a laser receiver for transferring a laser line to a work surface, the accessory comprising:
    a base plate with a front side and a rear side, the accessory arrangeable on the work surface with the base plate;
    a connector for connecting the laser receiver to the accessory; and
    a rotary joint arranged between the base plate and the connector, wherein the connector is rotatable about an axis of rotation relative to the base plate between a first angle and a second angle.

2. The accessory as recited in claim 1 wherein the rotary joint is lockable in at least one rotational position between the first angle and the second angle.

3. The accessory as recited in claim 1 wherein the rotary joint is lockable in a plurality of rotational positions between the first angle and the second angle.

4. The accessory as recited in claim 1 wherein the rotary joint is lockable in any rotational position between the first angle and the second angle.

5. The accessory as recited in claim 1 further comprising a marking element arranged on a side face of the base plate.

6. The accessory as recited in claim 5 wherein the marking element is adjustable as a foldable ruler about a pivot axis between a folded-in position and a folded-out position.

7. The accessory as recited in claim 6 wherein the pivot axis is arranged perpendicularly to the axis of rotation of the rotary joint.

8. The accessory as recited in claim 1 further comprising a first marking element arranged on a first side face of the base plate and a second marking element attached to a second side face of the base plate.

9. The accessory as recited in claim 8 wherein the first marking element is adjustable as a foldable first ruler about a first pivot axis between a folded-in position and a folded-out position, and the second marking element is adjustable as a foldable second ruler about a second pivot axis between a folded-in position and a folded-out position.

10. The accessory as recited in claim 9 wherein the first pivot axis is arranged perpendicularly to the axis of rotation of the rotary joint and the second pivot axis is arranged perpendicularly to the axis of rotation of the rotary joint.

11. The accessory as recited in claim 1 further comprising a spray device, including a container, a controller, and an actuator.

12. The accessory as recited in claim 11 wherein the spray device has a user interface or an interface to the laser receiver.

* * * * *